United States Patent [19]

Asher et al.

[11] Patent Number: 5,451,377
[45] Date of Patent: Sep. 19, 1995

[54] COMPOSITE STRUCTURES AND METHODS OF MANUFACTURING SUCH STRUCTURES

[75] Inventors: Don L. Asher, Broken Arrow; George O. Sherrick, Tulsa, both of Okla.

[73] Assignee: Rockwell International Corp., Seal Beach, Calif.

[21] Appl. No.: 128,169

[22] Filed: Sep. 29, 1993

[51] Int. Cl.⁶ .......................... B32B 3/28; D01D 5/20
[52] U.S. Cl. ........................ 428/167; 428/120; 428/172; 428/178; 428/260; 428/280; 428/292; 52/630; 264/167; 264/241; 264/257; 264/510
[58] Field of Search ............... 428/167, 178, 174, 172, 428/175, 120, 119, 188, 245, 260, 288, 292, 361, 397, 542.8; 264/167, 241, 257, 510; 52/630, 821

[56] References Cited

U.S. PATENT DOCUMENTS

| | | | |
|---|---|---|---|
| 3,990,080 | 11/1976 | Lundgren et al. | 343/782 |
| 3,995,081 | 11/1976 | Fant et al. | 428/119 |
| 4,313,991 | 2/1982 | Lamb | 428/131 |
| 4,542,055 | 9/1985 | Fitzsimmons | 428/102 |

*Primary Examiner*—Donald J. Loney
*Attorney, Agent, or Firm*—Terrell P. Lewis; Charles T. Silberberg

[57] ABSTRACT

A process for manufacturing stiffened composite skin panel structures possessing novel hollow crown-shaped stiffener elements, and further including any combination of forward spars, aft spars, and transversely extending shear ties. The novel process embraces fabrication and curing of these structures without the use of mandrels. In practicing the method, the crown-shaped stiffeners, spars and shear ties are integrally bonded to a planar or curved skin structure to provide axial stiffness in semimonocoque components such as aircraft wings, stabilizers, fuselages, etc. The method of fabrication yields highly producible, structurally efficient composite aircraft components.

26 Claims, 3 Drawing Sheets

COMPOSITE STRUCTURES AND METHODS OF MANUFACTURING SUCH STRUCTURES

BACKGROUND OF THE INVENTION

1. Field of the Invention

The present invention relates to the fabrication of composite structural units, and more particularly to a method for fabricating stiffened composite panel structures possessing hollow, U-shaped stiffener elements, spars, and transversely extending shear ties, where the fabrication and curing of the composite panel structures is accomplished without the use of mandrels.

2. Discussion of the Known Prior Art

With the increasing use of composite materials in the manufacture of aircraft components, a number of problems have arisen in connection with the application of such materials to design principles developed for conventional aluminum or titanium construction. Most of these problems center about the difficulty in interconnecting one component to one another, and involve the use of mechanical fasteners.

The currently-known advanced composite materials do not readily lend themselves physically or economically to extensive use of mechanical fasteners nor to very complex designs. The inclusion of multiple details in a composite material component increases the cost of manufacture to unacceptable levels and makes the application of automated procedures difficult, if not impossible. Mechanical fasteners are not physically well-suited to composite material components, and their use with such components tends to detract from the advantages of the unidirectional properties of advanced composite fibers. These problems have created a need for developing new techniques for economically producing composite material components, especially such components that are required to be load resisting.

In recent years, there have been a number of proposals relating to the structure and manufacture of composite material components. Some of these proposals involve the use of thermosetting adhesives instead of mechanical fasteners.

Manufacturing processes that use thermosetting adhesives generally require the separate forming and curing of the components and a further heating process to set the adhesives. Such multiple step processes have the disadvantages of being time consuming and expensive to carry out.

Other processes involve the separate forming of elements of a componenet and the curing together of the elements to form the desired structure. A serious problem encountered in connection with known composite material components embodying both approaches, i.e., bonding by adhesives and bonding by curing, has been the tendency for one part of the component to be peeled away from an adjacent part of the componenet when the component is subjected to stress forces. Recent proposals for overcoming such peel tendencies have the disadvantage of being quite complicated and expensive to carry out.

Aircraft components which have been formed from composite materials are disclosed by U.S. Pat. No. 3,995,080 Cogburn et al. U.S. Pat. No. 3,995,081 to Fant et al. These patents disclose a composite material plicated structural beam with a fairly complex design that is described as being peel-resistant. Each of the elements of the beam is formed separately, and then the elements are assembled and cured together to form the beam. The use of a destructible mandrel in the curing process is described.

Integrally stiffened structural shapes, fabricated by the lamination and resin polymerization or curing of resinous, filament reinforced composite materials, have typically taken the form of J-section and I-section structures. These designs have proven to be the most readily producible, but with great difficulty. For one thing, too many tooling variables must be considered; for another, it is clearly not cost effective to produce a J-section integrally stiffened structure in one cure cycle.

Therefore, a great need has arisen for a method of readily producing stiffened, fiber-reinforced composite structures useful in the construction of integrally stiffened components for aerospace vehicles which are cost and labor efficient and which save time in the fabrication process.

OBJECTS AND SUMMARY OF THE INVENTION

In view of the foregoing, it is therefore a principal object of the present invention to provide a method of producing stiffened, fiber-reinforced composite structures in which the need for forming mandrels is eliminated and through the practice of which all the drawbacks and disadvantages of the known methods are overcome.

Another object of the present invention is to provide a fiber-reinforced composite structure which is less costly and more readily producible than fiber-reinforced composite structures heretofore known in the art.

Still another object of the present invention is to provide a process for forming a panel composite structure including intersecting stiffener elements and blade reinforcing components positioned between inner and outer mold skins, wherein the stiffener elements, the reinforcing components and the skins of the structure are secured to one another in a single curing operation, and in which forming process and curing operation no mandrels are used.

In accordance with the method of the present invention, composite stiffener members presenting a hollow U-shaped cross-section and transversely disposed shear ties are positioned atop one surface of a thin skin or sheet of the same composite material. Both the stiffener members and the skin consist of plural layers of prepreg fiber-reinforced composite matrix material.

After assembly of the stiffener members, the transverse shear ties, spars and the skin, tube bags are inserted into the stiffener members. Thereafter, the entire structure is disposed and sealed within an enclosure, a vacuum is impressed upon the enclosure, and the resulting assembly is placed in an autoclave where it is heated to a curing or consolidation temperature so that the composite matrix material can attain solidification.

The preferred panel structure made according to the present invention is characterized by longitudinally extending hollow stiffener members that interconnect blade members disposed transversely of the stiffener members. Each hollow stiffener member possesses a U-shaped cross-section and includes a plurality of overlying layers of prepreg fabric material. Several U-shaped stiffener members are disposed alongside one another on the panel structure, with each stiffener member extending parallel to a neighboring U-shaped stiffener. The forward and aft spars are blade members disposed parallel to the U-shaped stiffener members. The forward spar is parallel to the forwardmost U-shaped stiffener and the aft spar is parallel to the aftmost U-shaped stiffener. All of the spars and the U-shaped stiffener members are interconnected by intersecting blade members preferably disposed substantially parallel to one another and substantially normal to the stiffener members.

BRIEF DESCRIPTION OF THE DRAWINGS

Other objects and advantages of the invention will become apparent upon reading the following detailed description and upon reference to the drawings, in which.

DETAILED DESCRIPTION OF THE PRESENT INVENTION

Structures of the present invention are advantageous in that they utilize high strength, low weight, filament reinforced, composite material in which high tensile strength filaments are used as the load bearing material with the reinforcements embedded in a polymeric, organic resinous matrix or matrices. As used herein, high strength is defined as including tension, compression and shear strength. Peel-resistant characteristics of structures of the invention facilitate a high degree of structural integrity in the ultimately formed shaped.

The present invention relates generally to integrally embodied or attachable structural shapes of laminated, filament reinforced, composite, resinous materials and a method for making the same. In particular, the invention embraces an integrally embodied stiffener having anisotropic properties which uses directionally arranged high tensile strength and compression load bearing filaments as reinforcements to a resinous matrix of lower strength characteristics so that weight savings are effected by orienting the reinforcements as necessary to accommodate designed-to loadings.

The panel structure according to the present invention includes a plurality of U-shaped, channel-like longitudinal stringers or stiffeners which are spaced apart and may or may not extend parallel to one another, a forward spar which runs parallel to the plurality of stiffeners on the forwardmost side of the panel, an aft spar which runs parallel to the plurality of stiffeners on the aftmost side of the panel, and a plurality of shear tie members extending transversely to, and engaging with, the spars and stiffeners. Each shear tie member is formed as a blade element having spaced U-shaped cut-out regions adapted to snugly engage the corresponding U-shaped portion of each stiffener.

In one embodiment of the invention, the panel structure is substantially planar; in another embodiment of the invention, the panel structure may be formed with curvature, either simple or complex.

Figure 1:
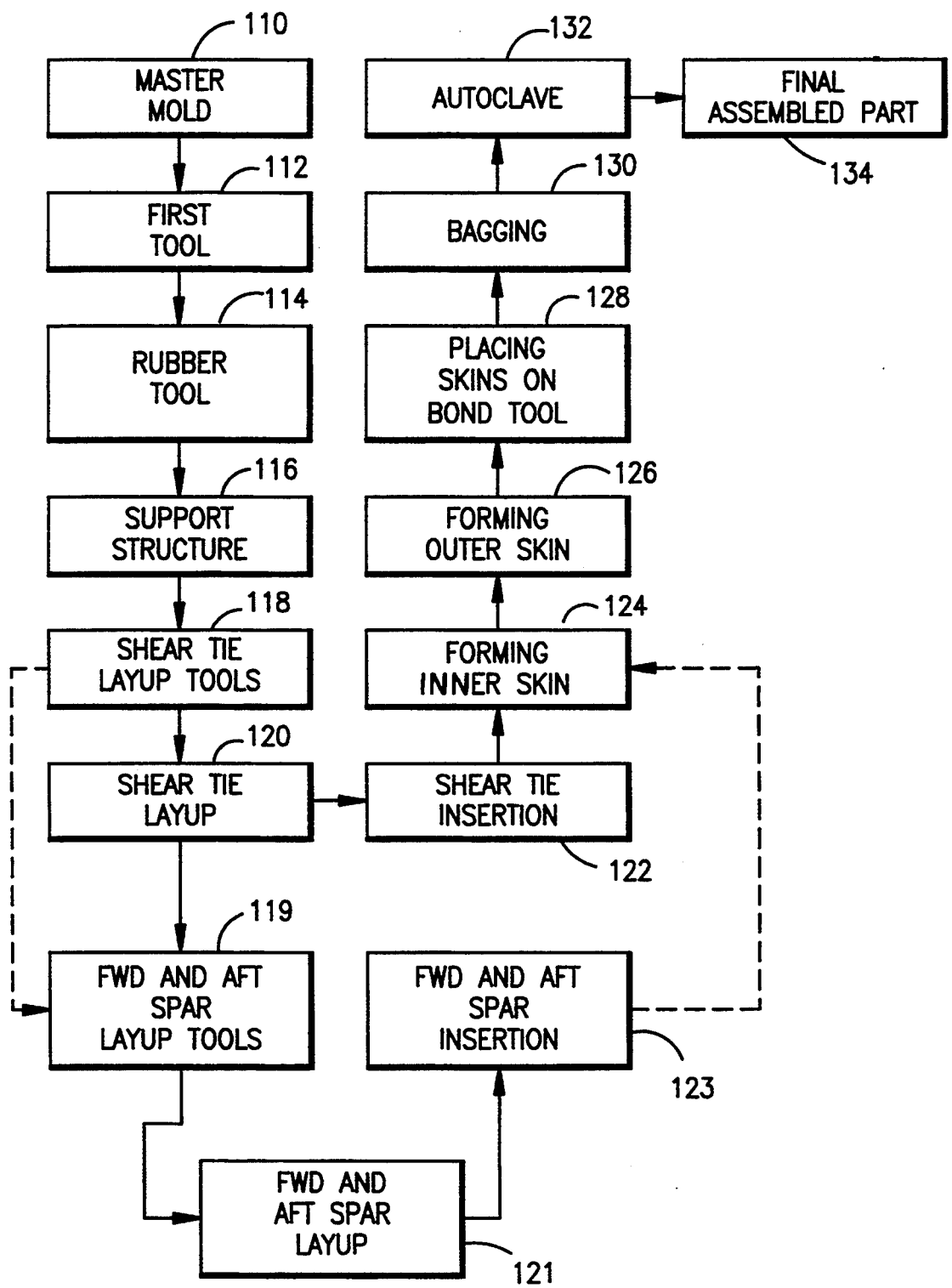
FIG. 1 is a flow chart illustrating the sequence of steps contemplated in the practice of the method of the present invention.
Figure 2:
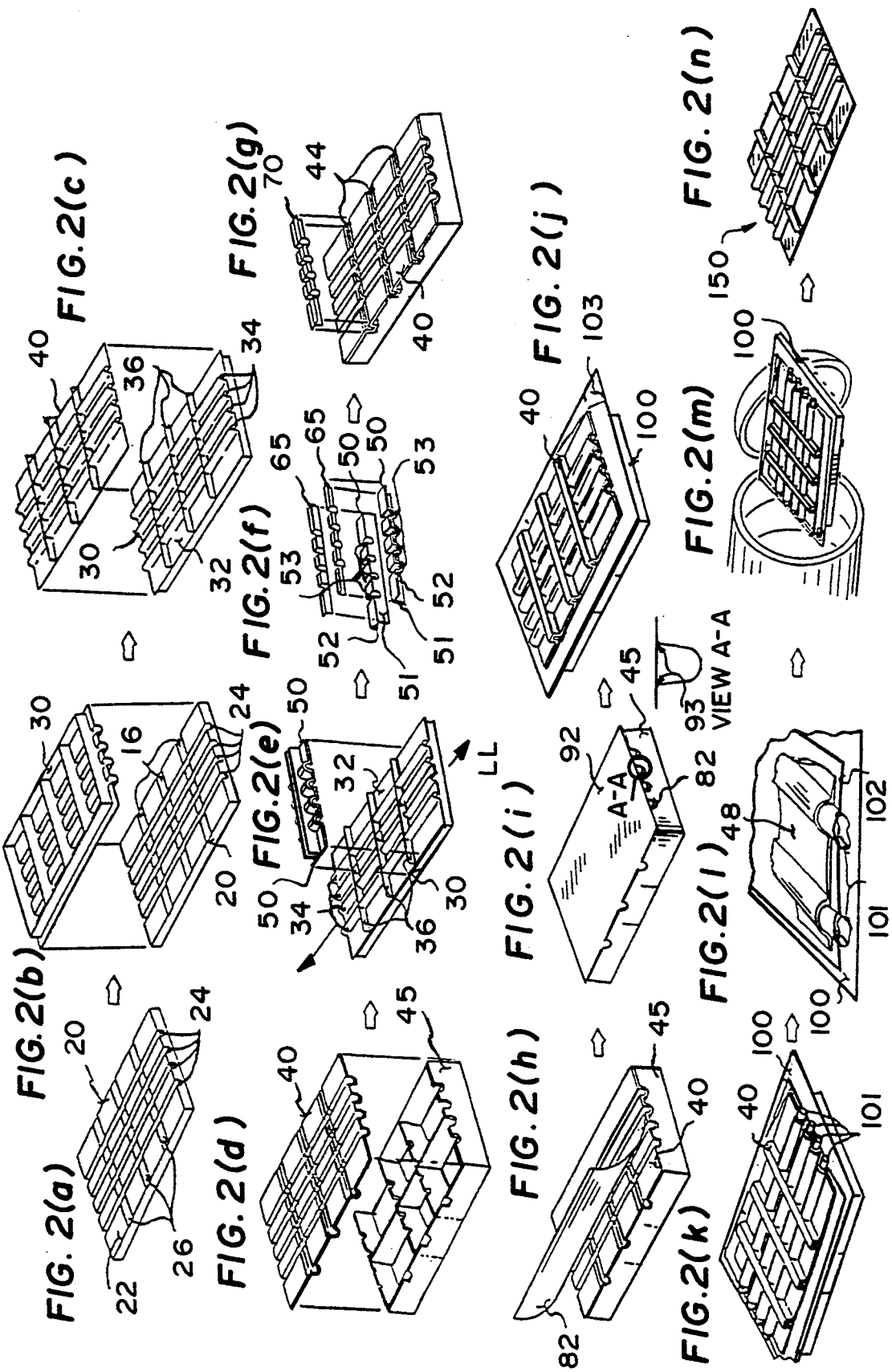
FIG. 2(a)–2(n) depict the sequence of events that take place during the practice of the present invention.

Reference should now be made to FIGS. 1 and 2. The flow chart of FIG. 1 illustrates the sequence of steps involved in preforming the method of the present invention. FIG. 2 presents various views showing a corresponding sequence of events taking place and/or structures formed during performance of the method of the present invention.

In the first step of the method, represented by block 110 in FIG. 1, a master mold 20 (shown in view (a) of FIG. 2) is fabricated exhibiting various topographical features designed such that work engaging surfaces of a composite tool, formed in the next step of the inventive process with the aid of the master mold, presents an inverted topography.

The manufacture of this master mold is performed by processes well-known in the prior art and does not form a part of the present invention. Preferably, the master mold is formed of wood, metal or a composite material such as graphite, and includes one surface 22 having a plurality of grooves 24 extending in a first direction. Surface 22 may also include a set of narrow grooves 26 which extend transversely to the first plurality of grooves 24.

In the second step of the method, represented by block 112 in FIG. 1, a tool 30 (shown in view (b) of FIG. 2) is fabricated using the master mold 20. The tool 30 is made of composite material, such as room-temperature cured graphite or fiberglass epoxy tooling material post-cured to 350° F. Tool 30 is used to fabricate a tool 40 represented by block 114 in FIG. 1, and shown in view (c) of FIG. 2. Tool 30, also shown in view (c) of FIG. 2, includes a work-engaging surface 32 which exhibits topographical characteristics which are the mirror image of the topoglogical characteristics of mold 20.

Thus, the work-engaging surface 32 of tool 30 includes a first set of generally U-shaped ridges 34 in inverse physical correspondence to the plurality of grooves 24 of mold 20. Another set of generally blade-shaped ridges could be formed on surface 32 of tool 30, where these ridges would be disposed exteriorly of the ridges 34 (see ridges 35 in FIG. 3) and arranged parallel to ridges 34 to simulate the forward and aft spars. A third set of generally blade-shaped ridges 36 extends transversely to and intersects the first set of ridges 34. The blade-shaped ridges are made of aluminum and are bonded on the tool 30 with a room-temperature cure polyester filler paste.

The third step of the method of the present invention is represented by block 114 in FIG. 1, and involves the fabrication of a rubber pressure pad 40 (shown in view (c) of FIG. 2) obtained by covering the tool 30 with non-silicone uncured rubber sheets integrally stiffened with graphite/epoxy prepreg fabric, and then placing tool 30 and tool 40 in a pressure vessel (eg., an autoclave) where tool 40 is cured by applying substantially 350° F. heat and substantially 90 psi pressure for substantially 90 minutes. The thus-cured tool 40 includes ridges 44 and 46, and is obtained from the tool 30 by simply lifting or peeling it from the surface of the tool 30.

The rubber pressure pad 40 serves two functions:

(1) It provides an excellent quality (minimal, if not no, surface imperfections) lay-up surface. One ply of graphite tooling fabric is preferably placed between each of the rubber plies to provide shape and strength, as well as to provide expansion and shrinkage stability. The tool 40 is reusable and repairable, and a release agent or release material can be applied to, or molded into, the rubber to ensure separation of the part from the tool.

(2) It serves as an elastomeric tool sometimes called a pressure intensifier. The rubber elastomer acts as a pressure pad to provide compression where the bagging material may be limited in movement. In so doing, the elastomer acts to transfer the hydrostatic pressure of the autoclave to the desired location. The rubber tool also provides a match-die finish on the bag side of the part.

The fourth step of the method of the present invention is represented by block 116 in FIG. 1, and involves the fabrication of support structure tool 45, depicted in view (d) of FIG. 2. This tool comprises prefabricated sheets of graphite/epoxy aluminum honeycomb sandwich tooling planks 42 cut and assembled on edge in a criss-crossing egg carton configuration with the upper edges of the assembled planks having recesses 44', 46' configured for receiving the corresponding blade-like ridges 44, 46 presented by the one surface of the tool 40. The primary purpose of tool 45, therefore, is to support the tool 40 when the latter is removed from the tool 30.

The fifth step of the method, represented by block 118 in FIG. 1, involves the fabrication of shear tie lay-up tools 50, 50', shown in view (e) of FIG. 2. The shear tie lay-up tools include two L-shaped members disposed next to one another with first portions having surfaces 51, 51' facing each other (see view (f) of FIG. 2). Each L-shaped member first portion delimits a longitudinal axis LL and includes a second portion 52 (52') disposed normal to the first portion and having a plurality of spaced apart, parallel grooves 53, 53' extending in a direction normal to the longitudinal axis LL. The grooves have substantially flat side walls and are configured as semi-circular troughs having substantially the same configuration as the shapes of the grooves 44 in the rubber layup tool 40.

The shear tie lay-up tools 50, 50' are fabricated using the work-engaging surface 32 of tool 30. Surface 32 includes blade-shaped ridges 36 extending transversely to, and intersecting the first plurality of, ridges 34. The blade-shaped ridges 36 are commonly known as shear ties. A shear tie mold is made by covering the ridges 36 and the area of intersecting ridges 34 with sheets of dry fiberglass cloth, wetted with room temperature cure polyester resin. After curing the sheets, the shear tie tools are removed from the tool 30.

Figure 3:
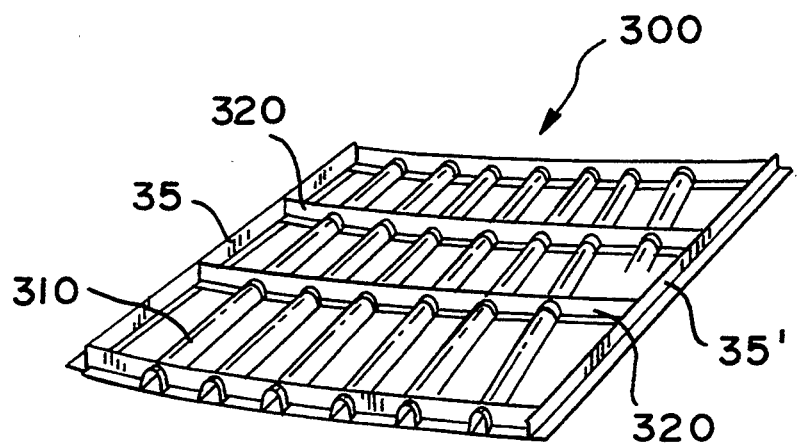
FIG. 3 shows one embodiment of a panel assembly which may be fabricated by practicing the method of the present invention.

The invention contemplates using a procedure similar to that described above for the formation of the shear tie lay-up tools 50, 50' to fabricate forward and aft spar tools for developing the forward and aft spar members shown in FIG. 3. An additional process step embracing the formation of the forward and aft spar tools to obtain the spar members is depicted by block 119 in FIG. 1.

The sixth step of the method, represented by block 120 in FIG. 1, involves formation of two L-shaped members 65, 65' (shown in view (f) of FIG. 2) by laying a plurality of layers of fiber-reinforced composite material on each L-shaped member 50, 50', shaping said layers into an elongated shape having a generally L-shaped cross-section with a web portion corresponding to first portions 51, 51' and a flange portion corresponding to the second portions 52, 52'.

Positioning the plurality of fiber-reinforced composite material layers to form each L-shaped member is accomplished by placing the fiber-reinforced composite material on the surfaces 51, 51' and semi-circular trough 53, 53'. Tools 50, 50' are affixed together at surfaces 51, 51' thus forming a single integrated T-shaped shear tie member 70 (shown in view (g) of FIG. 2). The T-shaped shear tie members may be formed simultaneously or separately, and after the parts are formed, they are frozen. Thereafter, the are separated and the parts are removed from the tools.

The present invention contemplates using a procedure similar to that described above for the formation of T-shaped members associated with fabrication of the forward and aft spar members shown in FIG. 3. An additional process step embracing the formation of the forward and aft spar members is depicted by block 119 in FIG. 1.

In the seventh step of the method, represented by block 122 in FIG. 1, the T-shaped shear tie members 70 are inserted into the cross grooves 44 provided in the rubber tool 40 as seen in view (g) of FIG. 2. This placement positions the formed T-shaped shear tie members longitudinally along the inner surface of opposite sides of the formed outer skin yet to be formed.

The T-shaped members 70 will be cured to the outer skin portion creating a single integrated load-resisting structure. This step would also enable insertion of the forward and aft spars in corresponding grooves in the rubber pad 40 (see block 123 in FIG. 1).

The eighth step of the method of the invention, shown at block 124 in FIG. 1, entails formation of the inner skin portion. This is accomplished by laying a plurality of fiber-reinforced composite material sheets 82 on the top surface of rubber lay-up tool 40 to form a surface corresponding to the surface of tool 30 (shown in view (h) of FIG. 2).

The sheets 82 of composite material are disposed on the contoured surface of the rubber layup tool 40 and are pressed downwardly either by hand or automated machinery so that the composite material follows the contours of the grooves in the rubber layup tool as well as the slots in the T-shaped shear ties. Once pressed into place, the layers of fiber reinforced composite material form a single integrated load resisting panel.

The ninth step of the method is represented by block 126 in FIG. 1, and entails formation of the outer skin portion. This is accomplished by disposing a plurality of layers of fiber-reinforced composite material sheets 92 on top of sheets 82, but without pressing the sheets down into the grooves of the rubber lay-up tool 40 (shown in view (i) in FIG. 2).

View A—A is taken along one end of the assembly illustrated in view (i) of FIG. 2 showing the top composite material sheets 92 and the bottom composite material sheets 82 assembled together on the rubber pad 40 on tool 45. FIG. A—A shows that the bottom sheets 82 follow the contour of the rubber pad 40 including the groove or channel formations, while the top sheets 92 merely lie atop and cover the bottom sheets forming a cover for the bottom sheet channel formations.

Robing 93, made from unidirectional fiber reinforced composite material, is placed at the juncture of the inner skin 82 and the outer skin 92. Robing 93 extends longitudinally of the assembly in the direction of each ridge 44, and serves to prevent the development of porosity or voids between the T-shaped spars and shear ties and the inner skin.

Thus, there is formed an integral structure of hollow U-shaped channel-like longitudinal stringers or stiffeners which are spaced apart and extend parallel to one another and a plurality of shear tie members extending transversely to, and engaging with, the stiffeners.

The tenth step of the method is represented by block 128 in FIG. 1, and involves the placement of the assembled structure shown in view (i) of FIG. 2 on top of the bond tool 100 (shown in view (j) in FIG. 2). Such placement is effected by first disposing the bond tool 100 on top of the assembled structure sitting on the support structure 45, and then rotating these components 180° (i.e., flipping them over) so that the tool 100 is on the bottom and the assembled structure is on the top.

It is to be noted that while the shape of the surface 103 of the bond tool 100 is a flat surface, the invention contemplates making the bond tool of any shape and contour, and of any material which can withstand the temperatures and pressures required to cure the fiber-reinforced composite materials.

After the placement of the integrated assembled structure on the bond tool 100, pre-fabricated high temperature seamless tube bags 101 (shown in view (k) in FIG. 2) are inserted into the hollow U-shaped channel-like longitudinal stiffeners. The tube bags lengths are determined by extending each end past the edge boundary of the rubber tool 40.

The eleventh step of the method, represented by block 130 in FIG. 1, involves preparing the surface of the bond tool 100 for bagging (shown in view l in FIG. 2). A sealant tape 102, designed for use in vacuum bagging, is disposed around the periphery of the bond tool 100 outside the boundary of the rubber lay-up tool 40 and between the underside of the seamless tube bags 101 and the bond tool surface.

Sealant tape is then wrapped around the outside of the tube bags 101 and connected to the sealant tape on the bond tool 100. Breather materials are placed on top of the rubber lay-up tool and a manifold is created around the periphery of the bond tool 100 to help evacuate air during the bagging process. Those skilled in the art can use various bagging techniques to accomplish the same result.

A bagging film is then placed over the rubber lay-up tool 100 and the edges are sealed to the sealant tape creating an airtight bag or chamber. Vacuum valves of conventional design are installed to the bag. The vacuum valves are generally a two-piece assembly with a self-positioning threaded locking pin. Air is evacuated from the interior chamber creating a vacuum between the bag and the bond tool 100. The vacuum provides the dual advantage of pressing the layers togethere and withdrawing excess volatiles which could be residual solvent, low-molecular weight resin components, or trapped air.

The next step of the method, represented by block 132 in FIG. 1, involves placing the bond tool 100 in an autoclave (refer to view (m) in FIG. 2). Here, the structure is subjected to temperature in the range of from substantially about 250° F. to substantially about 350° F. for substantially 90 minutes and at a pressure of substantially 90 psi.

The last step of the method is represented by block 134 in FIG. 1, and entails removing the newly-cured, unitarily-formed structurally reinforced panel assembly 150 from the autoclave, and then removing the evacuation apparatus as well as the bagging materials (see view (m) in FIG. 2).

Another embodiment 300 of a panel structure fabricated in accordance with the method of the invention which includes steps 119, 121 and 123 for including the forward and rear spars 35, 35' is shown more particularly in FIG. 3. The unitary panel assembly includes hollow U-shaped crown stiffener elements 310 and transversely extending shear ties 320 secured to a skin 330. The skin may be substantially flat or planar, as shown in view (m) of FIG. 2, or it may have curvature, either simple or complex. Each of the shear ties is formed with spaced U-shaped recesses 324 which engage the stiffener elements and hold them securely in their own relative arrangement on the skin.

Figure 4:
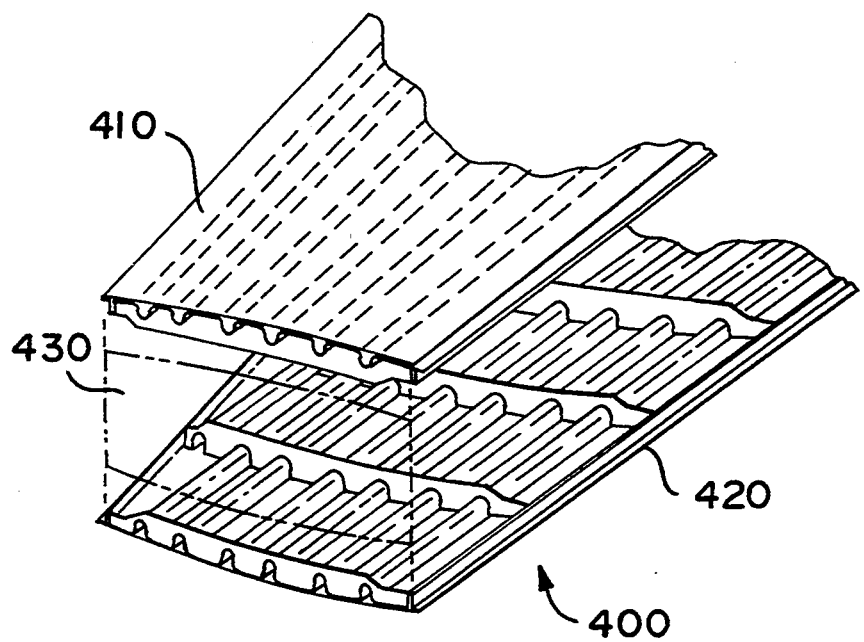
FIG. 4 shows a wing torque box which may be fabricated by assembling panel structures made in accordance with the present invention.

FIG. 4 is an exploded view of components for forming a wing structure 400. As shown, two panel assembly structures of the type shown in FIG. 3 are disposed in opposed, facing relationship, and secured together using fastening plates 430 and convention fastening means.

Some of the advantages achieved by the present invention are that the mold bodies can be made simpler in configuration and construction and do not require any machining operations. In addition, preparation for curing of the composite panel structures in an autoclave does not require use of mandrels typically used in conventional processes to hold portions of the panel structures in place prior to and during the curing process.

Thus it is apparent that there has been provided, in accordance with the invention, a method for forming gas-conveying channels in a stack of sheets of titanium alloy, or similar material, workpieces, as well as a novel channel-bearing stack which facilitates superplastic forming of the stack, which fully satisfies the objectives, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations which fall within the spirit and scope of the appended claims.

What I claim as my invention is:

1. A method for forming a unitized-construction, fiber-reinforced composite panel structure, comprising:

forming an assembly comprising a first skin member, a second skin member, and a plurality of parallel, closed channel means defined between said first and second skin members, said first and second skin members comprising fiber-reinforced composite material, preparing said assembly for autoclave curing by disposing first bagging materials within said channel means and second bagging materials around said assembly, and inflating said first and second bagging materials, and curing said assembly in an autoclave.

2. The method of claim 1, wherein said step of forming said assembly further includes providing a tool having a surface including a plurality of parallel channel-forming contours, and pressing said first skin member against said tool contoured surface so that said first skin member assumes a contoured surface corresponding to the contoured surface of said tool.

3. The method of claim 2, wherein said step of forming said assembly further includes disposing a second skin member atop the first skin member to form said assembly, said second skin member having a substantially planar surface, a major portion of said planar surface being in engagement with a substantial portion of the contoured surface of said first skin member.

4. The method of claim 2, wherein said tool surface further includes a plurality of slot-forming contours extending transversely of said channel-forming contours against which said first skin member is also pressed when forming said assembly.

5. The method of claim 1, wherein said step of curing said assembly comprises inflating said bagging material disposed within said channel means such that no mandrels are required to maintain the shape of said channel means during curing of said assembly.

6. The method of claim 1, wherein said step of disposing first bagging materials in said channel means comprises predetermining a desired shape of said channel means after curing of said assembly and inserting inflatable bags in said channel means having an inflated cross-sectional shape corresponding to said predetermined desired cross-sectional channel shape.

7. The method of claim 6, wherein said inflatable bags have a cross-sectional shape, when inflated, which is cylindrical.

8. The method of claim 6, wherein said inflatable bags have a cross-sectional shape, when inflated, which is rectangular.

9. The method of claim 6, wherein said inflatable bags disposed within the channel means determines the channel shape once the bags are inflated.

10. The method of claim 1, and further including the steps of
forming a second cured assembly substantially identical to the first cured assembly,
inverting said second cured assembly and positioning said inverted second assembly atop said first cured assembly so that said channel means of said first cured assembly face said channel means of said second cured assembly, and
securing said first and second cured assemblies together to form a box structure,
curing said assembly in an autoclave.

11. A structural load-bearing assembly, comprising:
a first substantially planar sheet member, said first sheet member comprising fiber-reinforced composite material,
a second sheet member of fiber-reinforced composite material, said second sheet member including a plurality of parallel, channel-shaped reinforcing elements and a plurality of stiffening elements extending at right angles to said reinforcing elements, and
said first and second sheet members being joined to one another through a curing process during which no mandrels were used to maintain the channel shape of the reinforcing elements.

12. The structural assembly of claim 11, and further comprising spar elements adjacent opposing edges of said first sheet member, said spar elements extending parallel to said stiffening elements.

13. A structural assembly, comprising:
a first subassembly including
a first sheet member comprising fiber-reinforced composite material,
a second sheet member of fiber-reinforced composite material, said second sheet member including a plurality of parallel, channel-shaped reinforcing elements and a plurality of stiffening elements extending at right angles to said reinforcing elements, and
said first and second sheet members being joined to one another through a curing process during which no mandrels were used to maintain the channel shape of the reinforcing elements, and
a second subassembly of construction similar to said first panel,
said first and second subassemblies being secured to one another in opposed, facing relationship.

14. The structural assembly of claim 13, wherein one of said subassemblies has a non-planar sheet member.

15. The structural assembly of claim 13, wherein said first and second subassemblies each have non-planar sheet members.

16. A structural component, comprising:
a first panel assembly including a sheet member comprised of uncured, prepreg, fiber-reinforced composite material, said sheet member bearing on one side thereof a plurality uncured, composite material, elongated stiffener members extending in first direction and a plurality of uncured, composite material, elongated blade members extending in a second direction non-parallel to said first direction,
said sheet member, said stiffener members and said blade members being joined to one another by a curing process so that said sheet member, said stiffener members and a said blade members form a unitary stiffened panel capable of bearing structural loads.

17. The structural component of claim 16, wherein said sheet member is substantially planar.

18. The structural component of claim 16, wherein said sheet member is non-planar, and said stiffener members and said blade members are complimentarily configured with said sheet member such that they engage and seat upon said sheet member along their entire lengths.

19. The structural component of claim 17, wherein said stiffener members are hollow.

20. The structural component of claim 18, wherein said first and second directions are substantially normal to one another.

21. The structural component of claim 16, wherein said first and second directions are substantially normal to one another.

22. The structural component of claim 16, and further including a second panel assembly substantially identical to said first panel assembly, and means for securing said first and second panel assemblies in spaced relationship relative to one another and such that the blade and stiffener members on the first panel assembly face the blade and stiffener members on the second panel assembly.

23. A process for making a structural component capable of supporting structural loads, comprising:
forming a sheet member from uncured prepreg fiber-reinforced composite matrix material,
forming an assembly by disposing on one side of said sheet member a plurality of uncured prepreg stiffener members extending in first direction and a plurality of uncured prepreg blade members extending in a second direction, the first and second directions being non-parallel, and
curing said assembly such that said sheet member, said stiffener members and said blade members are joined to each other to form a unitary, stiffened panel capable of bearing structural loads.

24. The process of claim 23, wherein said first and second directions are substantially normal to each other.

25. The process of claim 23, and further including the step of arranging a second panel assembly relative to the first panel assembly such that the blade and stiffener members on the first panel are in facing relationship to the blade and stiffener members on the second panel, providing means for maintaining said first and second panel assemblies in spaced apart relationship, and securing said first and second panel assemblies to said means for maintaining said panel assemblies in spaced apart relationship.

26. The process of claim 23, wherein said step of forming said sheet member comprises imparting a curvature to said sheet member during said forming step.

* * * * *